United States Patent [19]

Bauer et al.

[11] Patent Number: 4,984,841
[45] Date of Patent: Jan. 15, 1991

[54] FOLDING TOP FOR VEHICLES

[75] Inventors: Theodor Bauer, Altenriet; Gerhard Zweigart, Aidlingen; Kurt Gramer, Nagold, all of Fed. Rep. of Germany

[73] Assignee: Daimler-Benz Aktiengesellschaft, Fed. Rep. of Germany

[21] Appl. No.: 223,367

[22] Filed: Jul. 25, 1988

[30] Foreign Application Priority Data

Jul. 24, 1987 [DE] Fed. Rep. of Germany ....... 3724533

[51] Int. Cl.$^5$ ............................................... B60J 7/12
[52] U.S. Cl. .................................... 296/118; 296/116; 296/122
[58] Field of Search ............... 296/109, 116, 117, 121, 296/122, 107, 118

[56] References Cited

U.S. PATENT DOCUMENTS

| 4,712,828 | 12/1987 | Albrecht | 296/121 |
| 4,720,134 | 1/1988 | Seifort | 296/122 X |

FOREIGN PATENT DOCUMENTS 2154955  9/1985  United Kingdom ................ 296/116

Primary Examiner—Dennis H. Pedder
Attorney, Agent, or Firm—Evenson, Wands, Edwards, Lenahan & McKeown

[57] ABSTRACT

The invention relates to a folding top for vehicles, which comprises a main bow which can pivot about a vehicle transverse axis. At each vehicle side a control arm is assigned to the respective two lateral struts of the top of the main bow serving as component parts of a top framework covered by means of a flexible roof skin. Roof skin retaining rails for tightening the roof skin are arranged on the outside of the struts of the top. These retaining rails are capable of being transferred by means of automatic adjustment mechanisms from a stretching position, spread apart from the struts of the top, which is the case when the main bow is upright and in which position the lower ends of the roof skin retaining rails rest against the side-boards of the associated structure, into a folding position nearer the struts during the course of the swing-back movement of the main bow. In order to avoid disturbing grinding noises during the course of the folding operation, as well as damage to visible side-board surfaces, it is provided that the adjustment mechanisms are arranged independently of the side-boards and are forcibly controlled by utilizing the relative movement between the struts of the top and the control arms taking place during the shifting of the main bow.

29 Claims, 5 Drawing Sheets

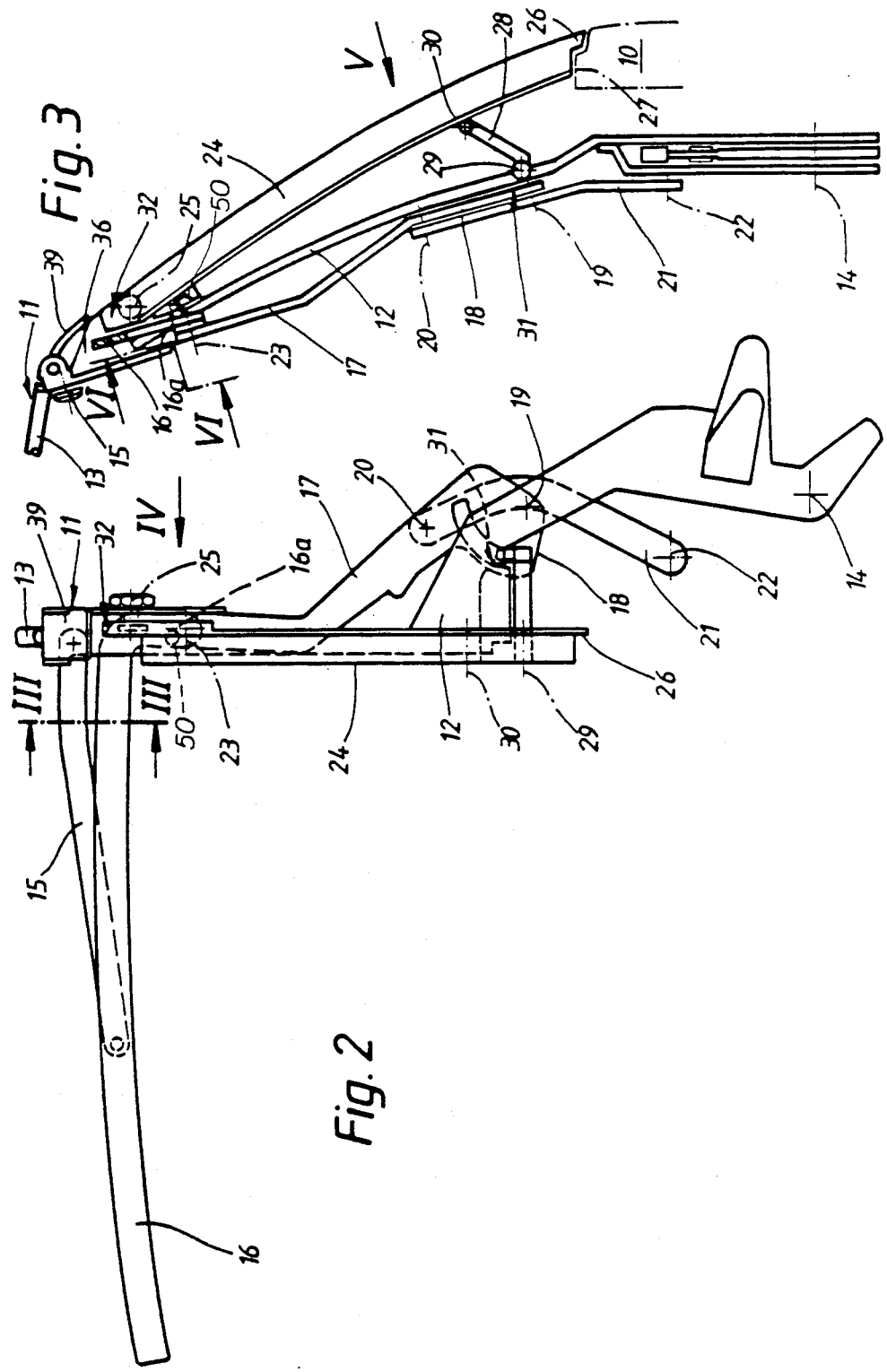

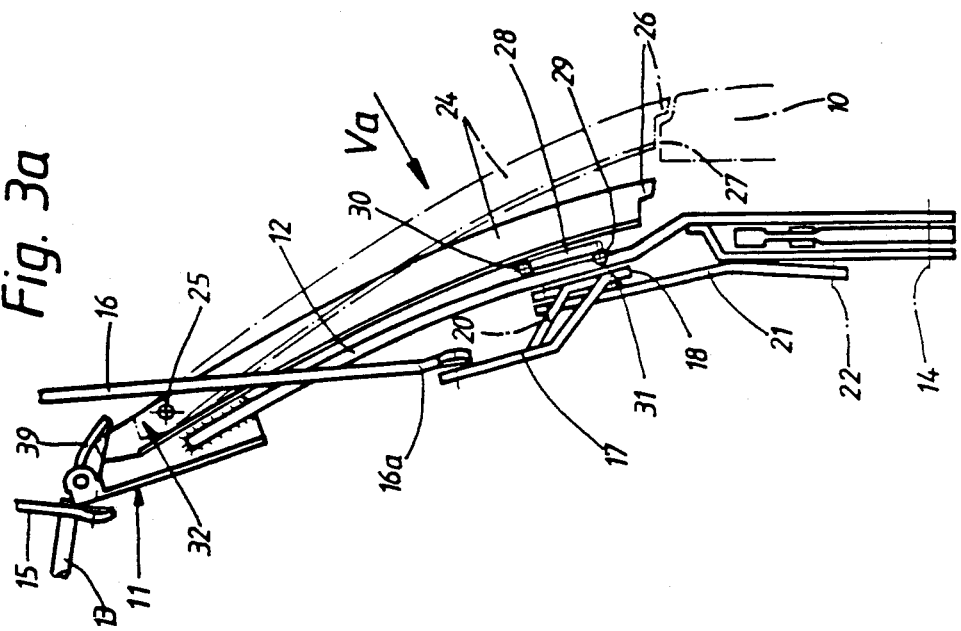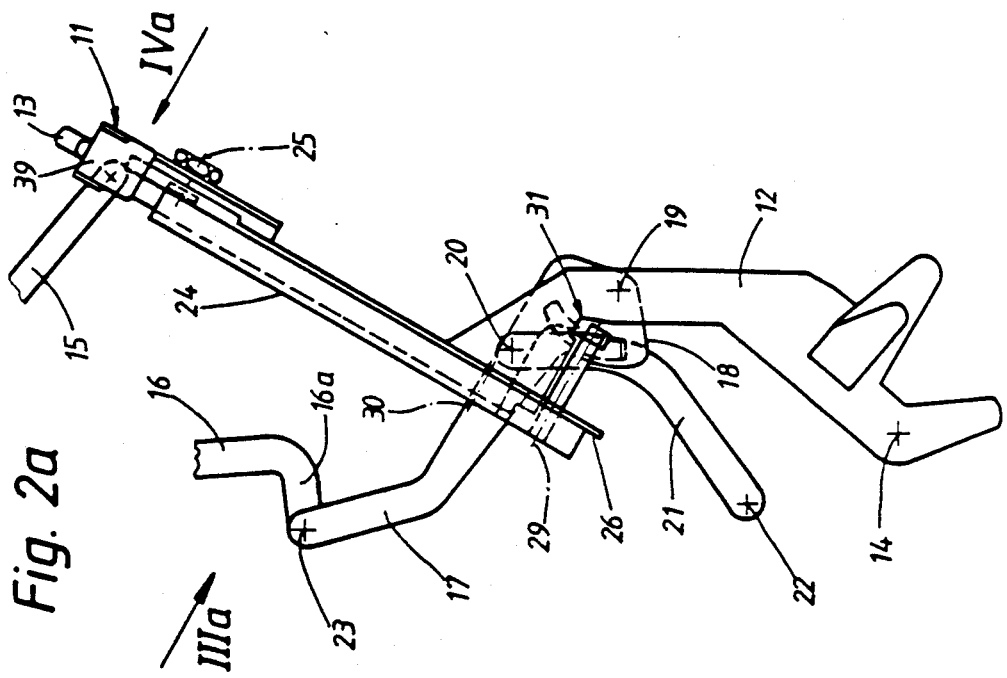

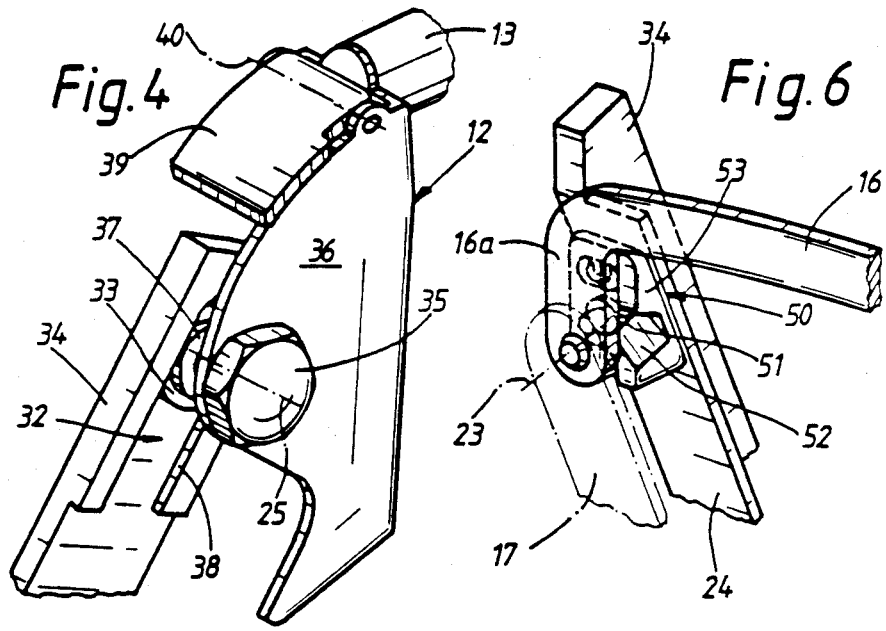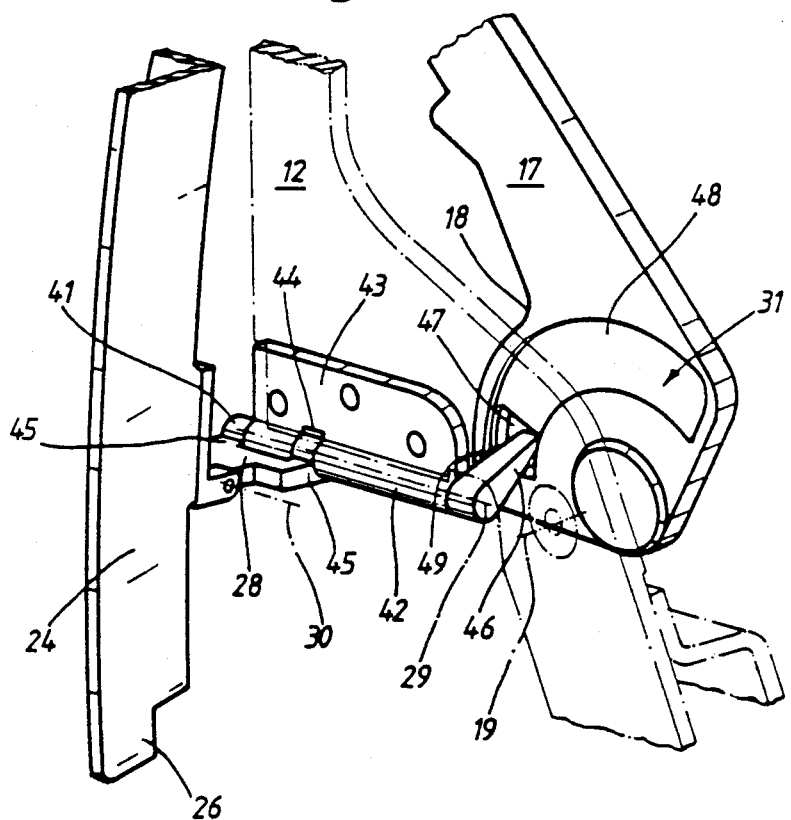

FOLDING TOP FOR VEHICLES

BACKGROUND AND SUMMARY OF THE INVENTION

The invention relates to a folding top for vehicles of the type having a main bow which is pivotable about a vehicle transverse axis between top closed and open positions. Control arms are interconnected with respective lateral struts of the main bow. A pair of roof skin retaining rails are arranged laterally outside the respective lateral struts of the main bow and are movable between a top closed position where they hold the roof skin taut in position with their lower ends supported at vehicle side-boards and a top open position with the lower ends removed from the side-boards and inwardly of the struts to accommodate stowage.

Reference is made also to related, commonly assigned U.S. patent application Ser. No. 07/223,368, filed on even date herewith, and based on German Patent Application No. P 37 24 532.5, filed July 24, 1987 in Germany. This related application discloses other aspects of referenced embodiments of a convertible folding top.

Such a folding top is described in German Patent Specification No. 3,523,433. The width of entry of such a folding top during lowering into an assigned stowage compartment for the top is in this case clearly smaller than its maximum width when the top is closed, so that it can be accommodated without any problems in compartments for tops of motor cars having a tapered rear end, which are becoming increasingly widespread for aerodynamic reasons. At the same time, operating convenience is not impaired since the reduction in width during swinging back of the main bow takes place automatically. To control the roof skin retaining rails dependently on the swing-back angle of the main bow, a toggle lever is articulated between these rails and the assigned struts of the top on both sides in the proximity of the side-board upper edges, the toggle joint of which lever is supported on a compartment strut cover plate, arranged underneath the roof skin retaining rails, when the roof skin retaining bows are spread. This support absorbs the pretensioning forces of a return spring, which tends to pull the roof skin retaining rail into the swung-in folding position. Due to this toggle lever arrangement, during the shifting of the main bow from its upright position, a sliding process of the toggle joint or of the setting screw on the compartment strut cover plate on the toggle joint side inevitably occurs. This sliding process is accompanied by undesirable grinding noises, since it is necessary to refrain from lubricating the sliding surface for reasons of the risk that passengers in the vehicle may be soiled. Since, in addition, the head of the setting screw only rests at a point on the compartment strut cover plate during the sliding process, a relatively high contact pressure is produced. which may result in surface damage to the compartment strut cover plate.

A object of the invention is to further develop a folding top of the above-noted type in such a way that any occurrence of disturbing grinding noises during the course of the swinging in or out of the roof skin retaining rails and any occurrence of surface damage to visible side-board surfaces are reliably avoided.

This object is achieved according to the invention in that adjustment mechanisms for controlling movement of the roof skin retaining rails are arranged independently of the side-boards and are forcibly controlled by utilizing the relative movement between the lateral struts of the top main bow and the control arms taking place during the shifting of the main bow. This type of a mechanical forced control of the roof skin retaining rails is completely isolated physically and functionally from the vehicle side board edge structure.

According to certain preferred embodiments of the invention, it is provided that the adjustment mechanisms are actuated independently of the side-boards and that the lower ends of the roof skin retaining rails can move, in a first phase of the swing-back movement of the main bow, automatically into a position laterally and vertically spaced from the side-boards. In this embodiment, the adjustment mechanisms can be arranged directly at or over the board edges of the vehicle if they can be moved upwards away from the side-board edges together with the ends of the roof skin retaining rails. Otherwise, a sufficient vertical distance from the board edges must be maintained in this arrangement.

An important advantage of this alternative solution is, however, to be seen in that, beyond achieving the object of the invention, it is possible to use roof skin retaining rails on the folding top which overlap somewhat the outer contour of the side-boards near the board edges when the top is closed. With such a roof tile-like overlap, in which the roof skin fastened to the roof skin retaining rail around its lower end region is also involved, a reliable sealing of the connecting joint of the folding top to the structure is ensured more easily.

Other objects, advantages and novel features of the present invention will become apparent from the following detailed description of the invention when considered in conjunction with the accompanying drawings.

BRIEF DESCRIPTION OF THE DRAWINGS

FIG. 2 is a partial schematic side view depicting the side-wall framework of the folding top according to FIG. 1;

FIG. 2a is a view showing the structure of FIG. 2 in a position corresponding to a partially shifted main bow;

FIG. 3 is a frontal view of the side-wall framework according to FIG. 2;

FIG. 3a is a view showing the structure of FIG. 3 in a position corresponding to a partially shifted main bow;

FIG. 4 is an enlarged perspective view showing an upper area of articulation of a roof skin retaining rail of the side-wall framework of FIGS. 1-3;

FIG. 4a is a view showing the structure of FIG. 4 in a position corresponding to a partially shifted main bow;

FIG. 5 is an enlarged perspective view showing a lowe area of articulation of the roof skin retaining rail on the main bow strut of the side-wall framework of FIGS. 1-3;

FIG. 5a is a view showing the structure of FIG. 5 in a position corresponding to a partially shifted main bow;

FIG. 6 shows a perspective inner view of the roof skin retaining rail according to FIG. 3, in the area of a locking mechanism; and FIG. 6a is a view showing the structure of FIG. 5 in a position corresponding to a partially shifted main bow;

DETAILED DESCRIPTION OF THE DRAWINGS

Figure 1:
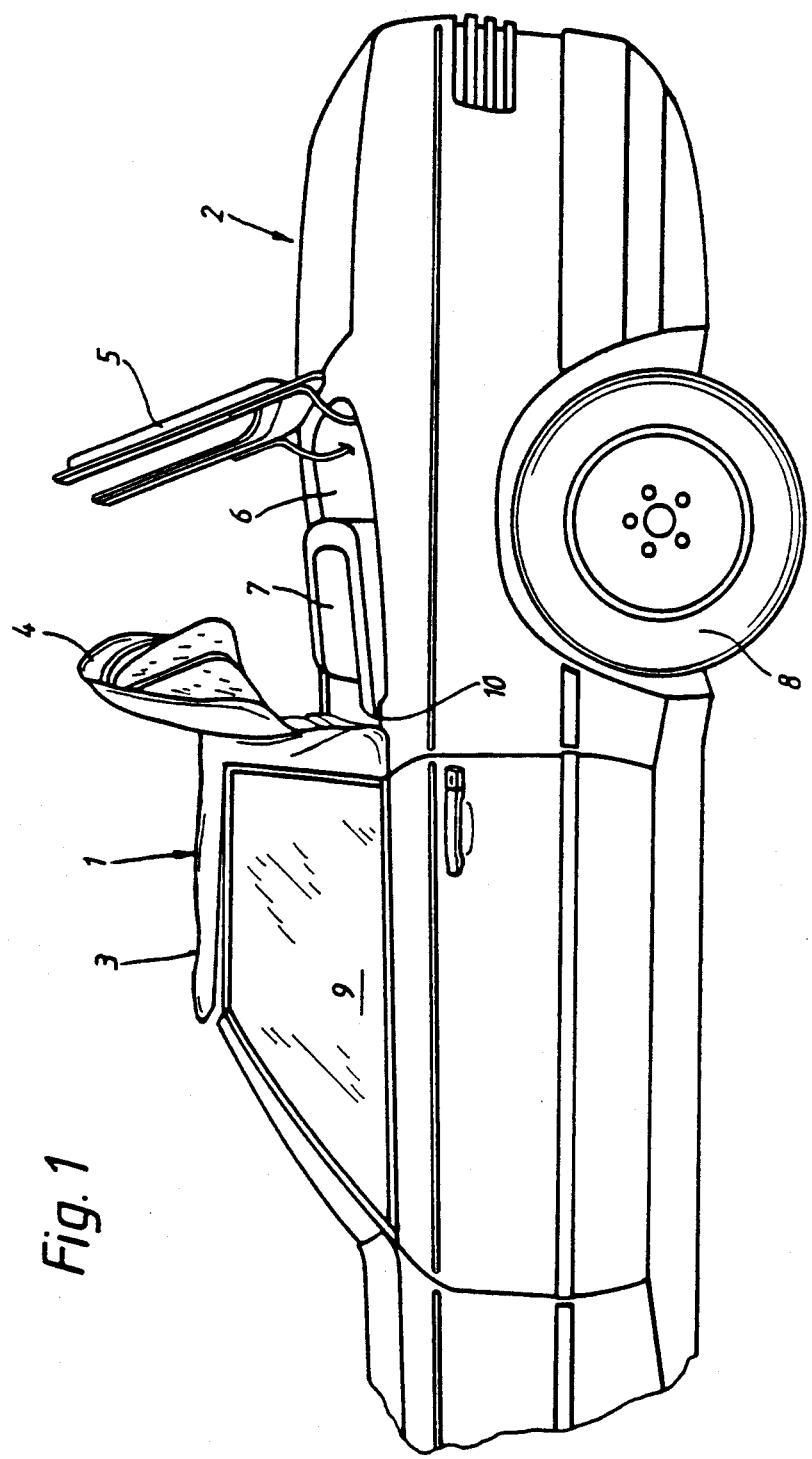
FIG. 1 is a schematic side view of a motor vehicle with a partially closed folding top, constructed in accordance with a preferred embodiment of the invention.

Referring to FIG. 1, there is illustrated a motor car 2 which comprises a supporting top framework which is covered by a roof skin 3 of textile material. Only a roof skin retaining bow of the top framework is visible in FIG. 1, which bow is shown only schematically located in an intermediate position. In this upright intermediate position, a top compartment cover 5, lying underneath the folding top 1 when it is closed, is transferred from its closed position into the open position shown. After release of the front closures of the top, the folding top 1, after being swivelled about a main axis running in vehicle transverse direction, can be lowered in an assigned compartment 6 for the top. Compartment 6 is of U-shaped design and goes around a rear seat area 7. With lowered folding top 1, the compartment cover 5 for the top can be closed again, so that the folding top 1 is completely concealed. The motor car 2 is in this case an aerodynamic model with a pronounced tapering of the rear end of the vehicle. For aerodynamic reasons, this tapering already begins in the area of the rear wheels 8, so that the greatest vehicle width is in front of the rear wheels 8. However, the roof skin 3 is held such that it on the one hand is flush with the rear edge of the side windows 9 and on the other hand slightly overlaps on the outside the lateral side-boards 10 limiting the compartment 6 for the top. As a result, when the folding top 1 is closed, the closing joint between the compartment cover 5 for the top and the side-boards 10 is also covered, which is desirable in particular for stylistic reasons.

However, due to this design it is no longer readily possible to fold in the folding top 1. While the U-shaped roof skin retaining bow 4 fits without any problems into the opening of the compartment 6 for the top since it can, during the curse of the folding operation, simultaneously be moved forwards as seen in the vehicle longitudinal direction and be swivelled about a vehicle transverse axis under mechanical force control, a width reduction of the folding top 1 is essential in the connecting region to the side windows 9 before entry into the compartment 6 for the top.

A design of the framework which makes this width reduction possible is described below. For this purpose, FIG. 2 shows, apart from the material retaining bow 4, the basic framework parts of a left side wall of the folding top 1. The right side wall of the framework of the top is not shown, as it is a mirror image of the left side wall, referred to the center longitudinal plane of the motor car 2. Furthermore, the two side walls of the framework of the top are rigidly interconnected in a transverse plane in the usual way by means of a main bow 11 spanning the vehicle width at the roof surface. Of the main bow 11, the strut 12 lying in the left side wall of the framework of the top and a assigned section of a bow tube 13 firmly connected to the strut 12 of the top are visible in FIG. 2.

Offset inward towards the side-board 10, on both sides in the region of the front ends of the extensions of the compartment 6 for the top, a bracket (not shown) is firmly connected to the vehicle bodywork. In the lower end region of the brackets, the main bow 11 is mounted pivotally about a main axis 14 running perpendicular to the longitudinal center plane of the motor car 2 on the lower ends of the struts 12. When in the top closed position, starting from the lower end of the strut 12, this strut 12 extends virtually vertically upwards approximately up to the upper edge of the sideboard 10. Above this point, strut 12 includes a section which is inclined obliquely forwards and extends into the proximity of the rear window edge of the side window 9. The strut 12 then runs virtually parallel to the rear edge of the side window 9 until it merges into the bow tube 13. Approximately underneath the bow tube connection, a rearward end of a roof frame guide arm 15 is articulated on the rear side of the strut 12. The roof frame guide arm 15 extends in the side wall plane forwards with a slight downward inclination and is articulated at approximately the center of the upper edge of the side window 9 at its front end on a lateral roof frame 16. The roof frame 16 is designed as one piece, extends approximately parallel to the upper edge of the side window 9 and extends up to the strut 12, a rear end section 16a of the roof frame 16 being angled off downwards by approximately 90 degrees, so that it lies in the main direction of extent of the strut 12 in this region.

An upper end of a main guide arm 17 is jointedly connected to the lower end of the angled-off end section 16a. The main guide arm 17 becomes aligned in its upper longitudinal section with the direction of extent of the rear end section 16a, so that it runs alongside the strut 12. After approximately one-third of its length, guide arm 17 merges into a longitudinal section which continues to be directed downwards and points obliquely rearwards, and ends in a lower end section which is angled off forwards and is designed as control cam 18, by being widened to approximately twice its original width. The course of the main guide arm 17 is chosen here such that its lower end section, angled off forwards, covers the obliquely forwards inclined region of the main strut 12, at a vertical distance above the upper edge of the side-board 10. Utilizing this configuration, a joint is provided between the control cam 18 and the main strut 12, the joint axis 19 of which runs perpendicular to the control cam plane.

Above the joint axis 19, there is arranged on the main guide arm 17 a further joint, the joint axis 20 of which runs parallel to the joint axis 19. By means of this joint 20, an upper end of a change-over guide arm 21 is mounted on the main guide arm 17. The change-over guide arm 21 extends from the joint axis 20, directed downwards slightly to the rear, is curved in the shape of an arc in the middle region and in the lower region consequently takes a course which is directed obliquely forwards. The lower end of the change-over guide arm 21 is attached in a joint independent of the struts of the top at the bracket, which joint is defined by the joint axis 22. The joint axis 22 runs parallel to the main axis 14 and is offset upwards in relation to the main axis 14 to such an extent that it lies approximately midway between the joint axis 19 and the main axis 14. In addition, the joint axis 22 is arranged offset forwards in relation to the main axis 14.

On the strut 12, a roof skin retaining rail 24 is articulated on the outside above the joint axis 23 between the main guide arm 17 and the rear end section 16a of the roof frame 16. The articulation takes place in the upper end region of the roof skin retaining rail 24 about a bearing axis 25 running approximately parallel to the center longitudinal axis of the motor car 2. The roof skin retaining rail 24 coves the straight longitudinal section of the strut 12, and likewise runs parallel to the rear edge of the side window 9. However, while retaining the direction of extent, its lower end region protrudes downwards beyond the longitudinal section of the strut 12 of the top lying parallel to the rear edge of the side window 9. The roof skin 3 is fastened, in a way not shown, to the roof skin retaining rail 24 which holds the roof skin 3 tightly stretched in the connecting region to the side window 9. The roof skin 3 is held here in such a way that it adjoins the window 9 with its outside surface flush to it.

As can be recognized in conjunction with FIG. 3, the roof skin retaining rail 24 consists of an angle profile which is bent correspondingly to the convexity of the side window 9. It is in a spread stretching position in which it is swivelled outwards away from the strut 12 about the bearing axis 25 and in which the side inclination of the roof skin 3 is matched to the inclination of the side window 9. The lower end of the roof skin retaining rail 24 is cut back from its end face on the inside, so that there remains only on the outside a narrow front end 26. The front end 26 covers on the outside an edging 27 raised up from the upper edge of the sideboard 19, so that the roof skin retaining rail 24 can only be swung in again once it has been first moved upwards. To make this possible, the roof skin retaining rail 24 is longitudinally displaceable as a whole relative to the strut 12. To transfer the axial advancement and the swivelling movement of the roof skin retaining rail 24, a spreader lever 28 is provided between the strut 12 of and the roof skin retaining rail 24. A lower end of the spreader lever 28 is attached on the laterally outward side of the strut 12 at a hinge axis 29 on a level with the joint axis 19. Starting from the hinge axis 29, the spreader lever 28 extends upward and laterally outwards at an angle of approximately 45 degrees to the strut 12. The upper end of spreader lever 28 is articulated at a second hinge axis 30 on the inner lateral surface of the roof skin retaining rail 24. The hinge axes 29 and 30 extend parallel with respect to each other and to the axial direction of the bearing axis 25. In this position of the framework of the top, the spreader lever 28 is blocked against swivelling by means of a control mechanism 31, so that the roof skin retaining rail 24 is fixed in this position.

By means of the control mechanism 31, the spreader lever 28 can be swivelled anti-clockwise about the hinge axis 29 during the course of the swing-back movement of the main bow 11, the hinge axis 30 being moved on a circular path corresponding to the length of the spreader lever 28. To make the associated longitudinal advancement of the roof skin retaining rail 24 possible, a sliding guide 32, which can be seen as a detail in FIG. 4, is provided between the bearing axis 25 and the upper end of the roof skin retaining rail 24. The sliding guide 32 comprises a cylinder bolt 33, defining the bearing axis 25, and a sliding piece 34 at the upper end of rail 24. The cylinder bolt 33 is axially braced by means of a fastening screw 35, which extends through an assigned bore in a bearing plate 36 jutting out from the strut 12 in the motor car transverse direction and is thereby held fixed on the counter-surface of the bearing plate 36. Facing the counter-surface of the bearing plate 36, the cylinder bolt 33 has been machined down to a narrow front pin 37. The sliding piece 34 is designed as a hollow box profile, in other words with rectangular clear cross-section. The clear rectangular cross-section is in this case dimensioned such that it is slightly larger than the cross-section of the cylinder bolt 33 in the region of its greatest diameter. In addition, a longitudinal slit 38 with a U-shaped clear cross-section has been cut out from the rear width side of the sliding piece 34, the clear width of which cross-section is slightly larger than the diameter of the front pin 37. Since the material thickness of the walls limiting the longitudinal slit 38 is smaller than the axial length of the front pin 37, the sliding piece 34 is guided axially and radially on the cylinder bolt 33.

In the direction of advancement of the sliding piece 34 there is arranged a vertical distance above its front face end a deflector cap 39, by which the roof skin 3 is kept away from the sliding guide 32. At the same time, cap 39 creates a widened bearing surface for the roof skin 3 in the transition region from the roof surface to the side wall surface. For this purpose, it is curved in this region in the shape of an arc corresponding to the contour of the motor car and is mounted at its upper end in the direct vicinity of the roof are pivotally about an axis 40 which is fixed to the bearing plate and the axial direction of which runs parallel to the bearing axis 25. As a result, when the abutting end of the sliding piece 34 hits a deflecting surface of the deflector cap 39 facing the strut 12, the deflector cap 39 can yield laterally upwards by being swivelled clockwise about the axis 40. However, a precondition for the desired impact is that the deflector cap 39 is previously in the initial position shown. For this purpose, an upwardly facing narrow side of the bearing plate 36 is shaped such that, matched to the deflecting surface contour of the deflector cap 39, it runs inwardly offset, reduced by the amount of the material thickness of the deflector cap 39. Towards the free end of the deflector cap 39, the latter is widened on the bearing plate side to such an extent that it rests over the surface of the narrow side of the bearing plate 36. The bearing plate 36 is thus also effective as a stop for the deflector cap 39, the deflector cap 39 being secured in place by the load of the roof skin 3 resting on it.

FIG. 5 shows the spreader lever arrangement and the control mechanism 31 as a detail in perspective representation, which makes clear the interaction of these devices. It can be recognized here that the hinge axis 29 is defined by a hinge bolt 41 which is rotatably mounted in a bearing sleeve 42 of a hinge plate 43 fastened on the strut 12. The bearing sleeve 42 is not continuous but divided into two sleeve sections by a separating gap 44 in the front half of its longitudinal extent. The spreader lever 28 is designed in the shape of fork where it faces the bearing sleeve 42, the fork ends 45 being connected fixedly in terms of rotation to the hinge bolt 41, in the region of the separating gap 44 on the one hand and in front of the bearing sleeve 42, from which one end of the hinge bolt 41 protrudes, on the other hand. This type of articulation of the spreader lever 28 produces a particularly stable support of the roof skin retaining rail 24 in the region of its lower end. An end of the hinge bolt 41 protruding from the bearing sleeve 42 at the rear is connected fixedly in terms of rotation to a driving finger 46, which is of wedge-shaped design and protrudes from under the strut transversely into the swivelling plane of the control cam 18. Its free end passes here through a through-opening 47, which is cut out from the opposite control cam 18. The through-opening 47 is located at the front end of a ditch-like depression 48, which serves as control track for the driving finger 46. In accordance with this intended purpose, the depression 48 runs on a circular path around the joint axis 19, its longitudinal extent being matched to the relative deflection of the main guide arm 17 to the strut 12.

To create the through-opening 47, a link 49 is disengaged from the bottom of the depression 48 and put out into a transversely jutting blocking position facing the strut 12, in which position it engages underneath the driving finger 46. The link 49 thus serves as a blocking stop, by which the driving finger 46 is reliably held in the clamped position shown. The clear length of the through-opening is dimensioned such that the engaging driving finger 46 can be tilted in it while maintaining the engagement if the main guide arm 17 is swung anti-clockwise. In addition, the clear depth of the depression 4 is matched to the length of the driving finger 46 in such a way that, in the tilted state, the free end of the driving finger 46 is supported on the bottom of the depression 48 when the main guide arm 17 is swivelled further. As a result, the driving finger 46 is blocked in a lower swivel position as long as the end of the driving finger 46 bears against the bottom of the depression 48.

Figures 4A, 5A, 6A:
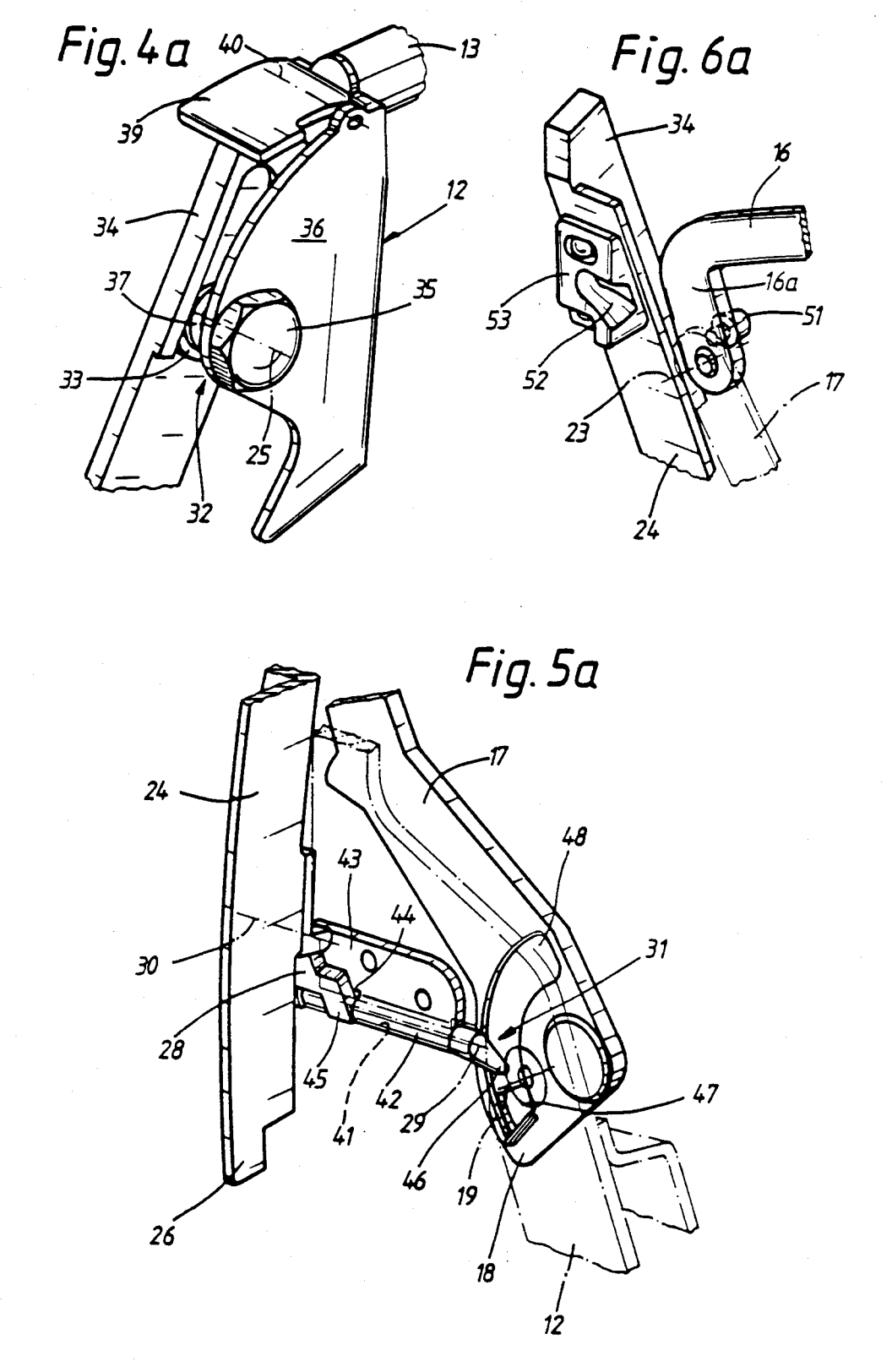

FIG. 6 shows an individual representation of a lock 50 between the rear end section 16a of the roof frame 16 and the roof skin retaining rail 24 along the line of intersection VI—VI in FIG. 3. In FIGS. 6 and 6a the upper end of rail 24 with sliding piece 34 is only schematically depicted.

This lock 50 serves the purpose of relieving the spreader lever 28 and the control mechanism 31 when the folding top 1 is closed since, in this operating state, these components would otherwise be exposed to a continuous stress due to the stretched roof skin 3 and any twisting of the bodywork.

For this purpose, vertically offset somewhat from the joint axis 23, a transverse pin 51 juts out from the lateral side of the rear end section 16a facing the roof skin retaining rail 24, which transverse pin is rigidly connected to the said end section, has a conical shape and tapers towards the roof skin retaining rail 24. The transverse pin 51 lies snugly in a clear entry cross-section 52 of an abutment 53, which is fastened oppositely on the width side of the roof skin retaining rail 24. The abutment 53 is of wedge-shaped design, matched to the angle formed between the roof skin retaining rail 24 and the longitudinal extent of the end section 16a, so that it lies flush on the lateral side of the end section 16a. The clear width of the entry cross-section 52 widens increasingly forwards, seen in vehicle longitudinal direction, from the seat of the transverse pin 51. This produces an automatic centering of the transverse pin 51 when the latter enters the assigned fork-shaped abutment 53 during the course of the closing operation of the folding top 1. Once the transverse pin 51 has assumed its end position in the entry cross-section 52, the roof skin retaining rail 24 is axially blocked by means of the lock 50.

The folding top 1 can be lowered in the assigned compartment 6 for the top by shifting of the main bow 11, which corresponds to a swivelling operation of the strut 12 of the top from the upright position according to FIG. 2 through an angle of approximately 90 degrees clockwise about the main axis 14. All other framework parts are moved at the same time by means of the main bow 11 and are forcibly controlled kinematically dependently on the swivel angle of the bow 11 at the time. The reduction in the swivelling range of the folding top 1 takes place in this case in the first folding phase. During the course of this first folding phase, which has just been concluded after reaching the position shown in FIG. 2a, the articulation point of the roof frame guide arm 15 on the strut 12 moves rearwards on a circular path around the main axis 14, the lateral roof frame 16 being taken along by means of the front articulation of the roof frame guide arm 15. Due to the fixed support to the bodywork of the joint axis 20 by means of the change-over guide arm 21, the main guide arm 17 cannot take part in the swivelling movement of the strut 12 of the top in the same direction, so that it is swivelled anti-clockwise about the joint axis 19 fixed to the roof strut. The joint axis 23 is thereby moved forwards and the front articulation point of the roof frame guide arm 15 is moved backwards. The dependently moved lateral roof frame 16 is in this case forcibly swivelled clockwise about the joint axis 23, jutting upwards virtually vertically after conclusion of the first folding phase. If the folding operation is continued, the roof frame 16 is turned through a total of approximately 180 degrees and lies in its end position above the assigned strut 12 in the compartment 6 for the top.

During the course of the first folding phase, the material retaining rail 24 is simultaneously transferred from the spread-apart stretching position which can be seen in FIG. 3 into a folding position nearer to the strut according to FIG. 3a, in which the material retaining rail 24 lies closely alongside the strut 12 of the top. This folded position comes about as follows:

Due to the opposite swivelling movement of the main guide arm 17 relative to the strut 12 about the joint axis 19, the control cam 18 integrated in the main guide arm 17 is also moved with it in the same direction. Consequently, the through-opening 47 also moves anti-clockwise on a circular path around the joint axis 19. During the process, the wall of the control cam 18 limiting the through-opening 47 upwards presses the free end of the driving finger 46 downwards, as a result of which the driving finger 46 is swivelled clockwise about the hinge axis 29 fixed to the strut 12. The hinge bolt 41 thereby transfers the swivelling movement of the driving finger 46 onto the spreader lever 28, so that the latter takes part in the swivelling movement of the driving finger 46 in the same direction. In the process, as can be clearly recognized from FIG. 5 in conjunction with FIG. 5a, due to the articulation at the hinge axis 30, the roof skin retaining rail 24 is displaced upwards in the direction of its longitudinal axis and at the same time folded in in the direction toward the strut 12. The axial component of this advancement is in this case accommodated by the sliding guide 32, the narrow sides of the sliding piece 34, limiting the longitudinal slit 38, sliding upwards on the circumference of the front pin 37. As can be recognized from FIG. 4 in conjunction with FIG. 4a, in the final phase of the linear advancement of the roof skin retaining rail 24, the upper end of the sliding piece 34 hits the rear deflecting surface of the deflector cap 39 and causes a slight lifting of the deflector cap 39 off the bearing plate 36, during which the roof skin 3 is gently pushed away upwards. Since the axial advancement of the roof skin retaining rail 24 is superimposed by the transverse advancement, the sliding operation of the sliding piece 34 on the front pin 37 accompanies a turning movement of the sliding piece 34 about the front pin 37, the roof skin retaining rail 24 being held on the front pin 37 in the turning-sliding position by support of the sliding piece 34 on the enclosed cylinder bolt 33.

In the upper folded-in end position according to FIG. 5a, the roof skin retaining rail 24 must be fixed as long as the folding top 1 is not in the first opening phase or the final closing phase. For this purpose, the length of the through-opening 47 and the extent of the depth of the depression 48 are matched to the length of the driving finger 46 such that, after conclusion of the adjustment operation of the roof skin retaining rail 24, the said driving finger is turned out of the clear cross-section of the through-opening 47 and, in downward inclination, is supported by its end on the bottom of the depression 48. Since the depression 48 has a constant clear cross-section, during further swivelling of the main guide arm 17, the end of the driving finger 46 slides along on the bottom of the depression 48 without changing the angular position of the driving finger 46 with respect to the control cam 18. In order that no grinding noises can occur in this case, the depression 48 is correspondingly lubricated. In this swivelling phase of the main guide arm 17, the spreader lever 28, and consequently the roof skin retaining rail 24, are also blocked by means of the blocked driving finger 46. Only when the main guide arm 17 is again swivelled clockwise during the course of the closing operation of the folding top can the driving finger 46 again change its angular position with respect to the control cam 18, as soon as the end reenters the clear cross-section of the through-opening 46. Thereafter, with the link 49 hitting the free end of the driving finger 46 during the course of the final closing phase of the folding top 1, the driving finger is forcibly transferred by a position swivelled anti-clockwise through approximately 90 degrees according to FIG. 5, the roof skin retaining rail 24 forcibly reassuming its extended stretching position.

This operation takes place at the same time as the locking operation of the roof skin retaining rail 24.

As can be seen from FIG. 6a, the end section 16a is already in the proximity of the roof skin retaining rail 24 and, with control by the main guide arm 17, is transferred during the course of the further closing movement of the folding top 1 into the transverse plane of the roof skin retaining rail 24. At the same time, the transverse pin 51 is automatically introduced into the entry cross-section 52 of the abutment 53, an automatic centering of the roof skin retaining rail 24 being produced due to the wedge-shaped design of the limiting surfaces of the entry cross-section 52. Consequently, at the moment the spread-apart stretching position of thereof skin retaining rail 24 is reached, it is also already in its axially locked end position.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Folding top for vehicles with a top framework to be covered by a flexible roof skin, the top framework comprising:
   a main bow having lateral struts, the main bow being pivotal about a vehicle transverse axis;
   a main guide arm connected with each of the lateral struts of the main bow;
   a roof skin retaining rail arranged laterally outside of each of the lateral struts for tightening the roof skin, each roof skin retaining rail being associated with one of the lateral struts of the main bow; and
   an automatic adjustment means associated with each of the roof skin retaining rails for moving an associated roof skin retaining rail between a stretching position spread apart from an associated lateral strut when the main bow is upright and in which position a lower end of the associated the roof skin retaining rail is juxtaposed to a respective sideboard of associated vehicle structure and a folding position nearer the associated lateral strut in response to pivotal movement of the main bow toward a rear of the vehicle, each of the adjustment means being arranged independently of each of the respective side-boards and being forcibly controlled utilizing relative movement between each of the lateral struts of the top and the associated main guide arms taking place during pivoting of the main bow.

2. Folding top according to claim 1, wherein the adjustment means are each controlled independently of each of the respective side-boards, and wherein, during an adjustment movement, the lower end of each of the roof skin retaining rails is forcibly moved in a first phase of the pivotal movement of the main bow automatically into a position further away from the respective sideboard and vertically offset with respect to the associated lateral struts.

3. Folding top according to claim 2, wherein each of the roof skin retaining rails is moved by one of the adjustment means both into the position nearer to the associated lateral strut and into the position further away from the respective side-board.

4. Folding top according to claim 2, wherein the adjustment means transfers movement to each of the roof skin retaining rails by utilizing the relative movement between each of the main guide arms and the associated lateral struts taking place during the pivotal movement of the main bow.

5. Folding top according to claim 1, wherein each of the adjustment means is arranged a vertical distance above a top edge of the respective side-boards of the vehicle when the main bow is upright.

6. Folding top according to claim 1, wherein each of the roof skin retaining rails is pivotally mounted at an upper end thereof on the associated lateral strut for movement about a bearing axis running approximately parallel to a center longitudinal axis of the vehicle.

7. Folding top according to claim 6, wherein a sliding guide is provided between the upper end of each of the roof skin retaining rails and the associated lateral strut for permitting an axial advancement of each of the roof skin retaining rails relative to the associated lateral strut, each sliding guide extending in the direction of a longitudinal axis of an associated roof skin retaining rail.

8. Folding top according to claim 7, wherein each of the roof skin retaining rails is guided longitudinally displaceably on an associated bearing axis running approximately parallel to a center longitudinal axis of the vehicle, the associated bearing axis being located at an upper end region of the roof skin retaining rail.

9. Folding top according to claim 8, wherein each of the bearing axes is defined by a cylinder bolt fixedly secured on one of the lateral struts.

10. Folding top according to claim 9, wherein each of the cylinder bolts is enclosed over an end face thereof and radially by a hollow-profile section of the associated roof skin retaining rail, a rectangular cross-section of each section being matched to a diametric cross-section of an associated cylinder bolt.

11. Folding top according to claim 9, wherein a deflector cap is arranged on each of the lateral struts above each upper end of each of the roof skin retaining rails, each of the deflector caps serving to maintain the skin at a distance from each of the sliding guides.

12. Folding top according to claim 11, wherein each of the deflector caps is mounted for movement about a pivot axis running approximately parallel to a center longitudinal axis of the vehicle.

13. Folding top according to claim 12, wherein each of the deflector caps is held against a stop in an initial position.

14. Folding top according to claim 13, wherein each of the deflector caps further includes a deflecting surface which is arranged at the initial position in such a way that the deflecting surface of each of the deflector caps is abuttingly engaged during the axial advancement of an associated roof skin retaining rail by the upper end of the associated roof skin retaining rail, each of the deflector caps being designed to yield pivotally upwards about its pivot axis running approximately parallel to the center longitudinal axis of the vehicle.

15. Folding top according to claim 1, wherein each of the main guide arms is swivelled in proximity to an associated adjustment means about a joint axis fixed to the associated lateral strut.

16. Folding top according to claim 15, wherein a control cam is connected to each of the main guide arms fixedly in terms of rotation, the control cam being rotatably mounted about a joint axis connecting each of the main guide arms to the associated lateral strut.

17. Folding top according to claim 16, wherein an end section of each of the main guide arms close to the joint axis is designed as the control cam.

18. Folding top according to claim 17, wherein a lever arrangement, arranged between each of the lateral struts and an associated roof skin retaining rail, is actuated upon relative deflection of an associated main guide arm with respect to the associated lateral strut by means of the control cam.

19. Folding top according to claim 18, wherein each of the lever arrangement is formed by a spreader lever which is fixedly articulated by ends thereof on an associated lateral strut and on an associated roof skin retaining rail.

20. Folding top according to claim 18, wherein articulation of each of the spreader levers takes place about a hinge axis running approximately parallel to a center longitudinal axis of the vehicle.

21. Folding top according to claim 20, wherein the hinge axis of each of the spreader levers is defined by a hinge bolt fixed to each of the spreader levers.

22. Folding top according to claim 21, wherein a driving finger is connected fixedly in terms of rotation to each of the hinge bolts, each driving finger protruding into a swivelling range of one of the control cams.

23. Folding top according to claim 22, wherein a free end of each of the driving fingers engages in a control track of each of the control cams respectively.

24. Folding top according to claim 23, wherein each of the control tracks is formed by a depression in each of the control cams extending in the form of an arc around the joint axis thereof, a longitudinal extent of each of the depressions being matched to a swivel angle deflection of an associated main guide arm relative to the associated lateral strut, each of the driving fingers being supported at the free end thereof on a bottom of an associated depression.

25. Folding top according to claim 24, wherein an opening is provided in a front end region of each of the depressions, the free end of each of the driving fingers passing through each of the openings in the first phase of the pivotal movement of the main bow strut.

26. Folding top according to claim 25, wherein a blocking stop juts out from the front end face of each of the depressions in the direction of the associated lateral strut.

27. Folding top according to claim 26, wherein the blocking stop is formed by a link, which, during formation of the opening, is pressed out from the control cam and extends into a jutting-out blocking position.

28. Folding top according to claim 1, wherein lateral top frame members extend along each side of a lateral top part of the top framework when the top is in a closed position and wherein rear end sections of each of the lateral top frames of the folding top are angled off downwards, as viewed with an upright main bow, so that each of the rear end sections lie in a main direction of extent of an associated lateral strut.

29. Folding top for vehicles with a top framework to be covered by a flexible roof skin, the top framework comprising:
   a main bow having lateral struts, the main bow being pivotable about a vehicle transverse axis;
   a main guide arm connected with each of the lateral struts of the main bow;
   a roof skin retaining rail arranged laterally outside each of the lateral struts for tightening the roof skin, each of the roof skin retaining rails being associated with one of the lateral struts of the main bow; and
   an automatic adjustment means associated with each of the roof skin retaining rails for moving an associated roof skin retaining rail between a stretching position spread apart from an associated lateral strut when the main bow is upright and in which position a lower end of the associated roof skin retaining rail is juxtaposed to a respective sideboard of associated vehicle structure and a folding position nearer the associated lateral strut in response to pivotal movement of the main bow toward a rear of the vehicle, wherein each of the adjustment means is controlled independently of the respective side-boards, and wherein each of the lower ends of the roof skin retaining rails is forcibly moved i a first phase of a pivotal movement of the main bow automatically into a position further away from the respective side-board and vertically offset with respect to the associated lateral strut.

* * * * *